(12) United States Patent
Quek et al.

(10) Patent No.: US 9,083,024 B2
(45) Date of Patent: Jul. 14, 2015

(54) STACK DESIGN FOR NA NICL BATTERY

(75) Inventors: Shu Ching Quek, Somerville, MA (US); Chandra Sekher Yerramalli, Niskayuna, NY (US); Curtis Alan Johnson, Niskayuna, NY (US); Reza Sarrafi-Nour, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 884 days.

(21) Appl. No.: 13/283,142

(22) Filed: Oct. 27, 2011

(65) Prior Publication Data
US 2013/0108912 A1    May 2, 2013

(51) Int. Cl.
| | |
|---|---|
| *H01M 2/18* | (2006.01) |
| *H01M 2/08* | (2006.01) |
| *H01M 4/70* | (2006.01) |
| *H01M 10/04* | (2006.01) |
| *H01M 10/30* | (2006.01) |

(52) U.S. Cl.
CPC ........ *H01M 2/08* (2013.01); *H01M 2/18* (2013.01); *H01M 4/70* (2013.01); *H01M 10/0418* (2013.01); *H01M 10/30* (2013.01); *Y02E 60/124* (2013.01); *Y10T 29/4911* (2015.01)

(58) Field of Classification Search
None
See application file for complete search history.

(56) References Cited

U.S. PATENT DOCUMENTS

| | | | | |
|---|---|---|---|---|
| 4,456,631 | A  * | 6/1984 | Crosbie et al. | 429/104 |
| 4,894,299 | A  * | 1/1990 | Morse | 429/104 |
| 4,910,105 | A  * | 3/1990 | Tilley et al. | 429/103 |
| 5,112,703 | A  * | 5/1992 | Koenig | 429/103 |
| 7,255,944 | B2 | 8/2007 | Akiyama et al. | |
| 7,585,581 | B2 | 9/2009 | Kaye | |
| 2007/0007141 | A1 | 1/2007 | Maeda et al. | |
| 2008/0302587 | A1 | 12/2008 | Nishiumi | |
| 2009/0142655 | A1 | 6/2009 | West et al. | |
| 2010/0120602 | A1 * | 5/2010 | Park et al. | 501/21 |

\* cited by examiner

*Primary Examiner* — Patrick Ryan
*Assistant Examiner* — Wyatt McConnell
(74) *Attorney, Agent, or Firm* — Francis T. Coppa

(57) ABSTRACT

A battery stack includes a plurality of curved base layers, at least one curved bipolar layer, at least one anode layer disposed between a first curved base layer of the plurality of curved base layers and the at least one curved bipolar layer, at least one cathode layer disposed between the at least one bipolar layer, a second base layer and a plurality of seals. The first base layer and the at least one bipolar layer are provided with one or more seals that seal the first base layer to the at least one bipolar layer without contacting the anode and/or the cathode layer.

11 Claims, 3 Drawing Sheets

STACK DESIGN FOR NA NICL BATTERY

BACKGROUND OF THE INVENTION

The field of the present disclosure relates generally to a stack design for batteries and a method of assembling a battery stack. More particularly, the present disclosure relates to a molten salt based battery stack design and method of assembly.

Ordinary stack designs include a plurality of a repeating unit of a bipolar plate, an anode, a base and a cathode. Ordinary stack designs typically are either a tubular type stack design or a planar type stack design. Multiple arrangements of the repeating unit form a stack having a designed voltage and current.

Tubular type stack designs comprise a series of concentric cylinders. The tubular type stack design typically includes concentrically arranged cylinders of a bipolar plate, anode, base and cathode. Tubular type stack designs thus resemble a cylindrical tube shape. Due to the shape of the tubular type stack design, the tubular type stack design has a high resistance (i.e., lower efficiency) compared to a planar type stack design, for example due to an increased travel distance of electrons.

Planar type stack designs comprise a series of parallel flat (i.e., planar) layers. The planar type stack design typically includes a repeating parallel layering of a bipolar plate, anode, base and cathode. Planar type stack designs may have a higher efficiency than tubular style stack designs due to a shorter electron travel distance. However, planar type stack designs require that seals be placed between each of the layers of the stack. In a planar type stack design, the seals contact the corrosive materials of the stack, such as a molten salt. Due to the seals contacting the molten salt, the seals may fail. In addition, planar type stack designs may include a base formed of a brittle material. Thus, planar type designs may include a base having an increased thickness in order to avoid undesirable cracking or breaking caused by pressure induced deformation. However, increasing the thickness of the base results in reduced efficiency, for example due to an increased travel distance of electrons.

BRIEF DESCRIPTION OF THE INVENTION

In one aspect, a battery stack comprises a plurality of curved base layers, at least one curved bipolar layer, at least one anode layer disposed between a first curved base layer of the plurality of curved base layers and the at least one curved bipolar layer, at least one cathode layer disposed between the at least one bipolar plate and a second base layer of the plurality of base layers and a plurality of seals. The first base layer and the at least one bipolar layer are provided with one or more seals that seal the first base layer to the at least one bipolar layer without contacting the anode layer.

In another aspect, a method of forming a battery stack comprises providing a first curved base layer, providing a curved bipolar layer, providing an anode layer between the first curved base layer and the curved bipolar plate, providing one or more seals to seal the anode layer between the first curved base layer and the curved bipolar plate, providing a cathode layer between the curved bipolar plate and a second base layer, and providing one or more seals to seal the anode layer between the first curved base layer and the curved bipolar plate. The one or more seals do not contact either the anode layer or the cathode layer.

In yet another aspect, a battery stack includes a plurality of conical base layers, at least one conical bipolar layer, at least one anode layer disposed between a first conical base layer of the plurality of conical base layers and the at least one conical bipolar layer, at least one cathode layer disposed between the at least one bipolar layer and a second base layer of the plurality of base layers, and a plurality of seals. The first base layer and the at least one bipolar layer are provided with one or more seals of the plurality of seals that seal the first base layer to the at least one bipolar layer without contacting the anode and/or the cathode layer.

DETAILED DESCRIPTION OF THE INVENTION

The battery stack and method of assembling a battery stack according to the present disclosure provides improved efficiency (e.g., low internal resistance), a reduction in the possibility of failure due to cracking/breaking based on pressure induced deformation, and reduced failure/corrosion of seals compared to cylindrical and planar type stack designs.

Figure 1:
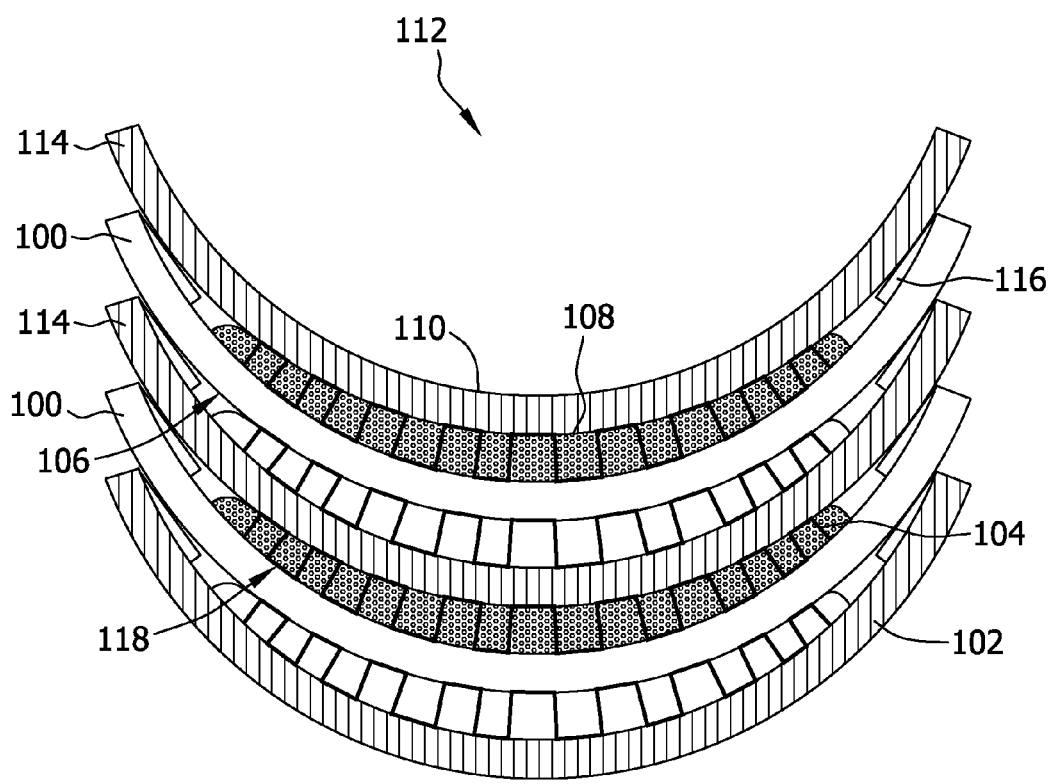
FIG. 1 is cross section of a battery stack according to a first exemplary embodiment of the present disclosure.

Shown generally in FIG. 1 is an example of a battery stack according to the present disclosure.

In embodiments, the battery stack includes one or more base layer 100. The base layer 100 acts as a solid electrolyte and is formed of an ionic conductive material, for example, beta alumina or the like. Base layer 100 separates an anode material 102 from a cathode material 104. Base layer 100 acts as a membrane that allows sodium ions to pass therethrough. In one embodiment, base layer 100 has a thickness of approximately 0.1 mm to 2 mm, more particularly, 0.5 mm to 1 mm.

In one embodiment, a carbon coating 106 is applied to the anode surface of base layer 100. Carbon coating 106 functions as a wetting agent for the base layer 100 and facilitates a uniform distribution of the anode material 102 on carbon coating 106. Carbon coating 106 forms a smooth surface for facilitating the sodium wetting of the beta alumina. In one embodiment, carbon coating 106 is applied to a partial surface, and in another embodiment, an entire surface of base layer 100. In yet another embodiment, when multiple base layers are included, one or more of the base layers 100 includes carbon coating 106. In still yet another embodiment, carbon coating 106 is approximately 10 µm to 25 µm thick.

Base layer 100 is formed in a curved shape, for example having a convex side 108 and a concave side 110. In some embodiments, base layer 100 is formed in a dome, or semispherical shape, having substantially a U-shaped cross section. In an upright position, convex side 108 faces a bottom side of the battery stack 112.

Battery stack 112 may include one or more bipolar layers 114. In one embodiment, bipolar layer 114 is formed of a conductive material, for example metal, aluminum, nickel, molybdenum, titanium, plated steel or the like. In another embodiment, bipolar layer 114 has a thickness of approximately 1 to 1.2 mm, however, the thickness of bipolar layer 114 depends upon the size of the battery stack 112. In another embodiment, bipolar layer 114 functions to separate anode material 102 from cathode material 104. In one embodiment, bipolar layer 114 is made of nickel, steel or a material compatible with the anode and cathode materials.

As shown in FIG. 1, for example, bipolar layer 114 is formed in a curved shape (e.g., having a convex side and a concave side). Generally, a convex side of bipolar layer 114 faces a concave side of base layer 100, or vice versa. In one embodiment, the curved shape of bipolar layer 114 is the same shape (e.g., a shape having the same curvature) as base layer 100. In another embodiment, bipolar layer 114 is formed in a dome, or semi-spherical shape, having substantially a U-shaped cross-section (FIG. 1).

Figure 2:
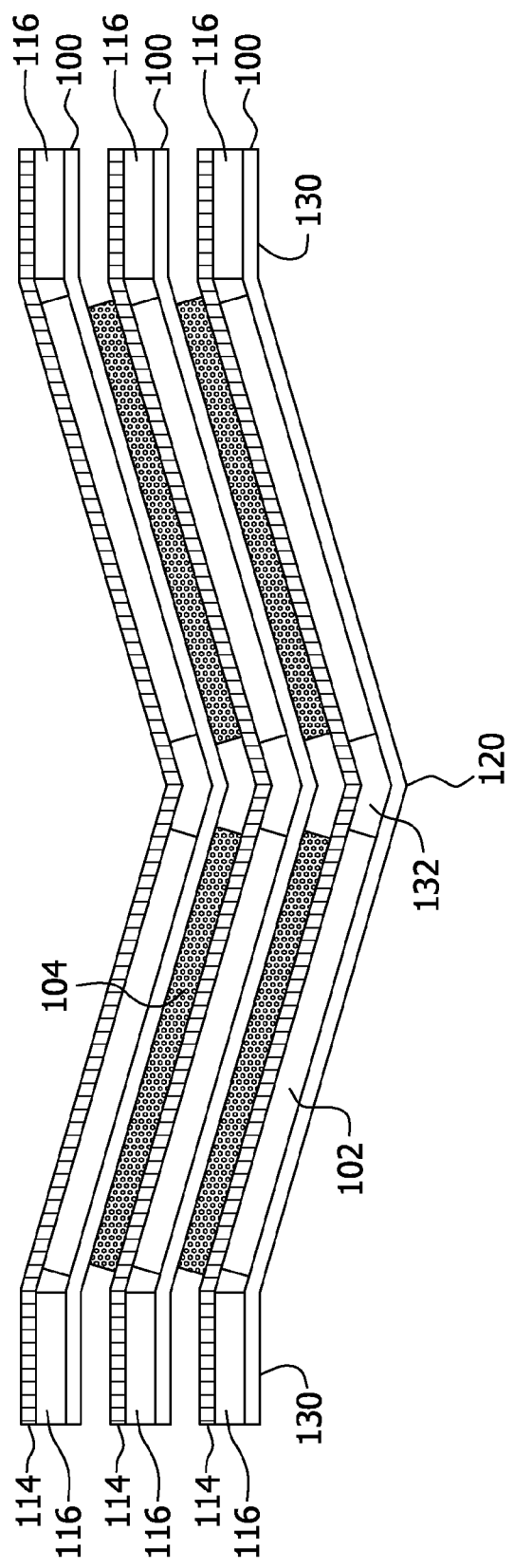
FIG. 2 is cross section of a battery stack according to a second exemplary embodiment of the present disclosure.
Figure 3:
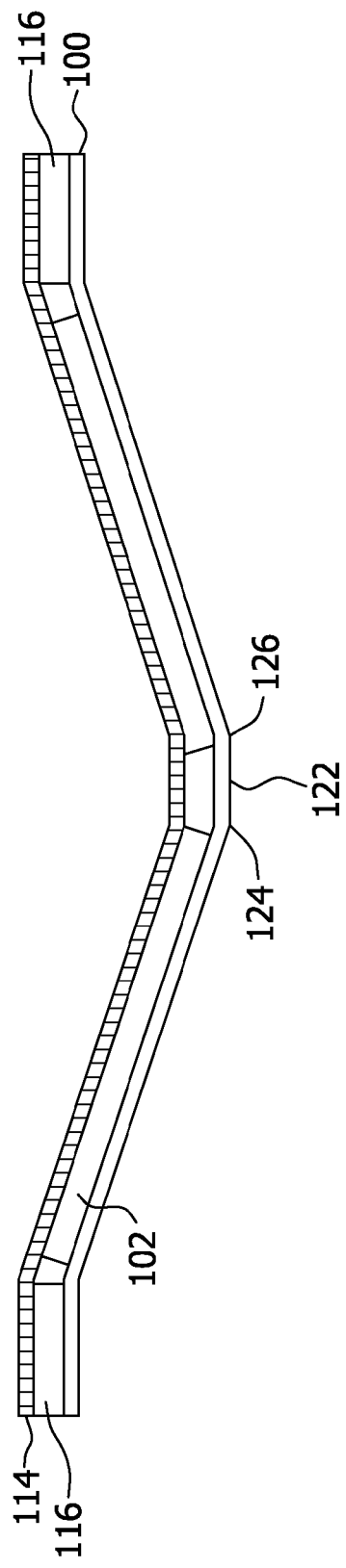
FIG. 3 is cross section of a battery stack according to a third exemplary embodiment of the present disclosure.
Figure 4:
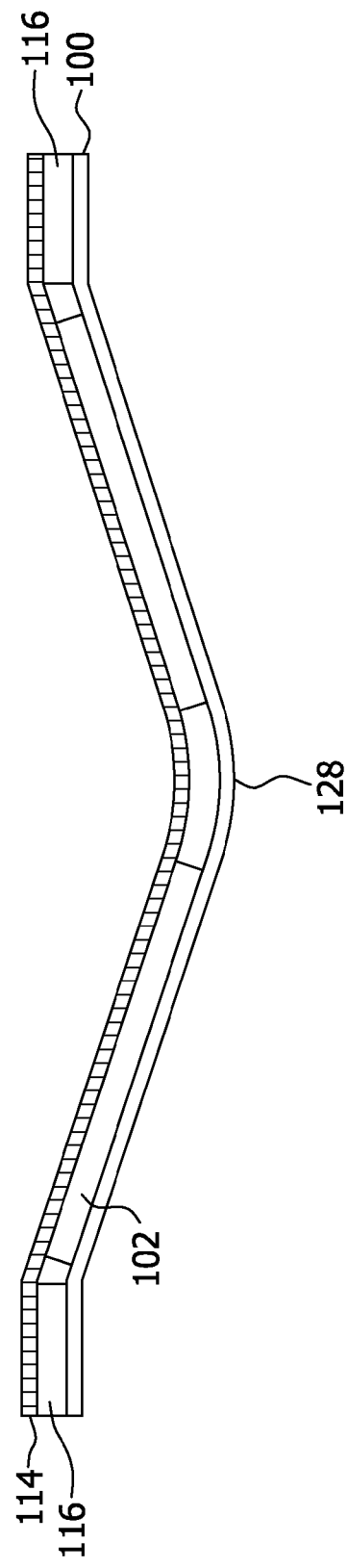
FIG. 4 is cross section of a battery stack according to a fourth exemplary embodiment of the present disclosure.

In another embodiment, as shown in FIGS. 2-4 for example, bipolar layer 114 and base layer 100 may be formed in a generally conical shape, (i.e. having a substantially V-shaped cross section). In one embodiment, the substantially V-shaped cross section comes to an angular point 120 on the convex side of the stack (FIG. 2). In another embodiment, the substantially V-shaped cross section has a flattened portion 122 (FIG. 3), forming a first angle 124 and a second angle 126 with the other portions of the base layer 100 and/or bipolar layer 114. In yet another embodiment, the substantially V-shaped cross section has a curved bottom portion 128 (FIG. 4).

Anode material 102 is disposed between base layer 100 and bipolar layer 114. Anode material 102 is an electronically conductive material that can pass through the base material under application of an electric field, such as sodium or the like. In one embodiment, the volume of the chamber containing anode material 102 is approximately 50% to 60% of the volume of the chamber containing cathode material 104.

Cathode material 104 is disposed between a base layer 100 and bipolar layer 114, such that cathode material 104 and anode material 102 are separated by one of base layer 100 and bipolar layer 114. In one embodiment, cathode material 104 is an electrolyte mixed with a reactive metal, for example, an electrolyte formed of a molten salt, such as sodium chloroaluminate or the like, and a metal formed from nickel particles.

In embodiments, for example, to reduce stress concentrations, electrically active chemistry and/or electrical connections may be disposed in a location apart from angular point 120, by insulating space 132, or by including flattened portion 122 and/or curved portion 128 in the stack. Insulating space 132 may be made of an insulating material, be an empty space, or contain an electrically insulating gas.

Seals 116 are disposed between base layer 100 and bipolar layer 114. In one embodiment, one or more seals 116 are disposed between base layer 100 and bipolar layer 114 to seal anode material 102 between base layer 100 and bipolar layer 114. In another embodiment, one or more seals are disposed between base layer 100 and bipolar layer 114 to seal cathode material 104 between base layer 100 and bipolar layer 114.

Seals are disposed between base layer 100 and bipolar layer 114 in a position that reduces or eliminates the possibility of anode material 102 and/or cathode material 104 from contacting seals 116. In one embodiment, seals 116 are positioned at a vertical height along the battery stack 112 that reduces or eliminates the possibility of anode material 102 and/or cathode material 104 from contacting seals 116. For example, when battery stack 112 is in an upright position, anode material 102 is contained between a convex side of bipolar layer 114 and a concave side of base layer 10. In such configuration, the curved shape of base layer 100 and bipolar layer 114 are configured such that the anode material 102 (and similarly, cathode material 104) is disposed toward a middle portion of battery stack 112. In another embodiment, seals 116 are positioned toward an outer edge of base layer 100 and bipolar layer 114 such that seals 116 are not in contact with anode material 102 and/or cathode material 104. As such, seals 116 are not subjected to corrosive elements of anode material 102 and cathode material 104.

Each of the seals 116 may be made of the same, or different materials. In one embodiment, seals 116 are all made of the same material. A reduction in manufacturing costs may be realized by manufacturing all of the seals 116 from the same material. In one embodiment, seals 116 may be made of a ceramic, glass or the like. In another embodiment, seals 116 are formed of a material that is compatible with anode material 102 and/or cathode material 104. In yet another embodiment, seals 116 are fixed in place using an adhesive material.

In embodiments, the seals may be formed in a shape corresponding to the shape of one or more of the base layer 100 and the bipolar layer 114. In embodiments, the seals 116 may have a substantially triangular cross section (FIG. 1). In other embodiments, the stack includes flattened portions 130 at one or more edges of the base layer 100 and/or the bipolar layer 114 (FIGS. 2-4) and seals 116 are disposed at the flatted portions. In yet other embodiments, seals 116 have a substantially constant thickness, which may reduce manufacturing costs for the seals. In still yet other embodiments, a one or more seals 116 have the triangular cross section and other seals 116 have a substantially constant thickness.

In one embodiment, current collectors 118 are disposed to be in contact with anode material 102 and/or cathode material 104. In embodiments, current collectors 118 are formed of a conductive material, such as, for example, a metal, a metal wool, copper, stainless steel, a porous material or other materials compatible with anode material 102 and/or cathode material 104. In another embodiment current collectors 118 provide additional surface area in contact with anode material 102 and/or cathode material 104 for current collection. In yet another embodiment, current collectors 118 provide support for base layer 100 and/pr bipolar layer 114.

In embodiments, bipolar layer 114 is fully or partially coated with a carbon coating 106. In one embodiment, carbon coating 106 provides a smoother surface than a surface of bipolar layer 114. Carbon coating 106 facilitates wetting of the bipolar layer 114. In one embodiment, carbon coating 106 is formed such that there are no gaps in carbon coating 106 on bipolar layer 114.

In embodiments, the curved shape of base layer 100 and/or bipolar layer 114 is configured to withstand a predetermined pressure difference between the anode and the cathode of the battery stack 112. For example, if a pressure on an anode side of battery stack 112 is higher than a pressure on a cathode side of battery stack 112, the curved shape of base layer 100 and/or bipolar layer 114 is configured to have a bending stiffness that prevents cracking and/or breaking of battery stack 112. In another embodiment, battery stack 112 is configured to translate a load, caused by a pressure difference between an anode side and a cathode side of the battery stack 112, across the curved surface of base layer 100 and/or bipolar layer 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A battery stack, comprising:
a plurality of conical base layers,
at least one conical bipolar layer;
at least one anode layer disposed between a first conical base layer of the plurality of conical base layers and the at least one conical bipolar layer;
at least one cathode layer disposed between the at least one bipolar layer and a second conical base layer of the plurality of conical base layers; and
a plurality of seals;
wherein the first base layer and the at least one bipolar layer are provided with one or more seals of the plurality of seals that seal the first base layer to the at least one bipolar layer without contacting the anode and/or the cathode layer.

2. The battery stack according to claim 1, wherein one or more seals of the plurality of seals are positioned at least at an outer edge of each of the first conical base layer and the at least one conical bipolar layer, which directly seal the first conical base layer to the at least one conical bipolar layer without contacting the anode and/or the cathode layer.

3. The battery stack according to claim 1, further comprising:
one or more current collectors disposed between the at least one conical bipolar layer and the first conical base layer and/or the second conical base layer.

4. The battery stack according to claim 1, wherein the anode layer and/or the cathode layer comprise a molten salt.

5. The battery stack according to claim 1, wherein:
the conical bipolar layer comprises nickel metal; and
the plurality of conical base layers comprise beta alumina.

6. The battery stack according to claim 5, wherein:
the plurality of conical base layers comprises a carbon coating layer.

7. The battery stack according to claim 1, wherein:
the plurality of conical base layers and the at least one conical bipolar layer have a substantially U-shaped cross section.

8. The battery stack according to claim 7, wherein:
the plurality of conical base layers and the conical bipolar layer are stacked vertically.

9. The battery stack according to claim 1, wherein:
the plurality of seals are all formed of the same material.

10. The battery stack according to claim 1, wherein:
the plurality of seals comprise a glass material.

11. The battery stack according to claim 1, wherein:
the plurality of conical base layers and the at least one conical bipolar layer have substantially the same shape.

* * * * *